United States Patent
Toews

[11] Patent Number: 6,079,114
[45] Date of Patent: Jun. 27, 2000

[54] TELESCOPING MARKER ARM

[75] Inventor: Bernie Toews, MacGregor, Canada

[73] Assignee: Triple Star Manufacturing, Ltd., MacGregor, Canada

[21] Appl. No.: 08/990,428

[22] Filed: Dec. 15, 1997

[51] Int. Cl.[7] .......................... A01B 69/02; A01B 17/00
[52] U.S. Cl. .......................... 33/624; 33/264; 33/1 H; 172/126
[58] Field of Search .......................... 33/1 H, 18.1, 41.1, 33/264, 275 R, 286, 521, 624; 172/126

[56] References Cited

U.S. PATENT DOCUMENTS

| | | | |
|---|---|---|---|
| 1,541,456 | 6/1925 | Wilson | 33/264 |
| 2,483,011 | 9/1949 | Hudson . | |
| 3,774,690 | 11/1973 | Booth | 172/126 |
| 3,943,635 | 3/1976 | Ito | 33/264 |
| 4,011,914 | 3/1977 | Elmer | 172/126 |
| 4,203,226 | 5/1980 | Hasquenoph | 33/264 |
| 4,280,281 | 7/1981 | Gerber | 33/264 |
| 4,467,872 | 8/1984 | Hodapp | 172/126 |
| 4,526,236 | 7/1985 | Jacobsen | 172/126 |
| 4,583,598 | 4/1986 | Knels | 172/126 |
| 4,986,367 | 1/1991 | Kinzenbaw | 172/126 |
| 5,027,525 | 7/1991 | Haukaas | 33/624 |
| 5,146,686 | 9/1992 | Brown | 33/264 |
| 5,164,826 | 11/1992 | Dailey | 358/100 |
| 5,379,847 | 1/1995 | Snyder | 172/126 |
| 5,542,190 | 8/1996 | Wahls | 33/624 |

*Primary Examiner*—Christopher W. Fulton
*Assistant Examiner*—Quyen Doan
*Attorney, Agent, or Firm*—Murray E. Thrift; Adrian D. Battison; Michael R. Williams

[57] ABSTRACT

A field marker is mounted on the rear corner of the seeder or cultivator frame so that its weight is supported by the packer wheels or support wheel axles at the rear of the frame, thus minimizing the imbalance and uneven seeding that will occur with marker mounted on the front corner. The marker arm is slidably extensible to avoid complex knee-action joints and the mechanisms required to operate them.

20 Claims, 5 Drawing Sheets

TELESCOPING MARKER ARM

FIELD OF THE INVENTION

The present invention relates to a field marker for agricultural use.

BACKGROUND

One known type of field marker includes a disc on the end of a long arm that, in use, extends from the side of the implement with which the marker is being used. To store such an arm for transport, folding or knee-action arms have been developed. With air seeders, these markers are designed to be mounted on the front corner of the cultivator frame in order to avoid interference with the tank of the seeder and to prevent projection of the marker past the rear of the seeder. Air seeders are very sensitive to weight distribution. Mounting a marker on the front corner of the seeder frame causes tilting of the frame and uneven seeding depth.

Another problem with known markers is creep of the marker arm from its correct marking position when in use. There is considerable drag on a marker and this is resisted by the hydraulic cylinder that pushes the marker out to its in use position and maintains it in that position. While a locking valve may be used to hold the cylinder in the extended condition, leakage past the piston will occur, causing the marker to creep rearwardly out of position.

The folding or knee-action markers are relatively complex structures. To unfold the arm, mechanical arms, cables or chains and associated components are used.

The present invention is concerned with certain improvements in disc type field markers that are intended to ameliorate the problems of the prior art.

SUMMARY

According to the present invention there is provided a field marker for use on an agricultural implement for marking the path of travel of the implement in a forwards direction over a field, the implement having a frame, the marker comprising:

a marker arm with an outer marker end and an inner, mounting end;

marking means mounted on the arm at the marker end for marking the field;

arm mounting means for mounting the arm on the frame for movement between a transport position projecting forwardly from the mounting means and a use position projecting laterally from the frame; and arm actuator means selectively actuable to move the arm between the transport and use positions.

The marker is thus mounted on the rear corner of the implement frame. This rear corner mounting puts the weight of the marker unit on the packer wheels at the rear of the seeder. This makes the seeder more stable, providing more uniform seed depth and making the seeder easier to balance.

In preferred embodiments of the invention, the arm is extensible by sliding an outer end section of the arm on a section mounted on the frame. This avoids the complex folding mechanisms of the known markers. It also provides great flexibility as to air seeder width, since the extension length of the arm is easily adjusted using arm mounted stops.

The arm actuator is preferably an hydraulic cylinder that is fully extended in the use position of the arm. This arrangement avoids the prior art use of the cylinder as a compression strut, which leads to creep. In the retracted position, the arm may be supported in a cradle so that there will be no stress on the cylinder.

BRIEF DESCRIPTION OF THE DRAWINGS

In the accompanying drawings, which illustrate an exemplary embodiment of the present invention.

DETAILED DESCRIPTION

Figure 2:
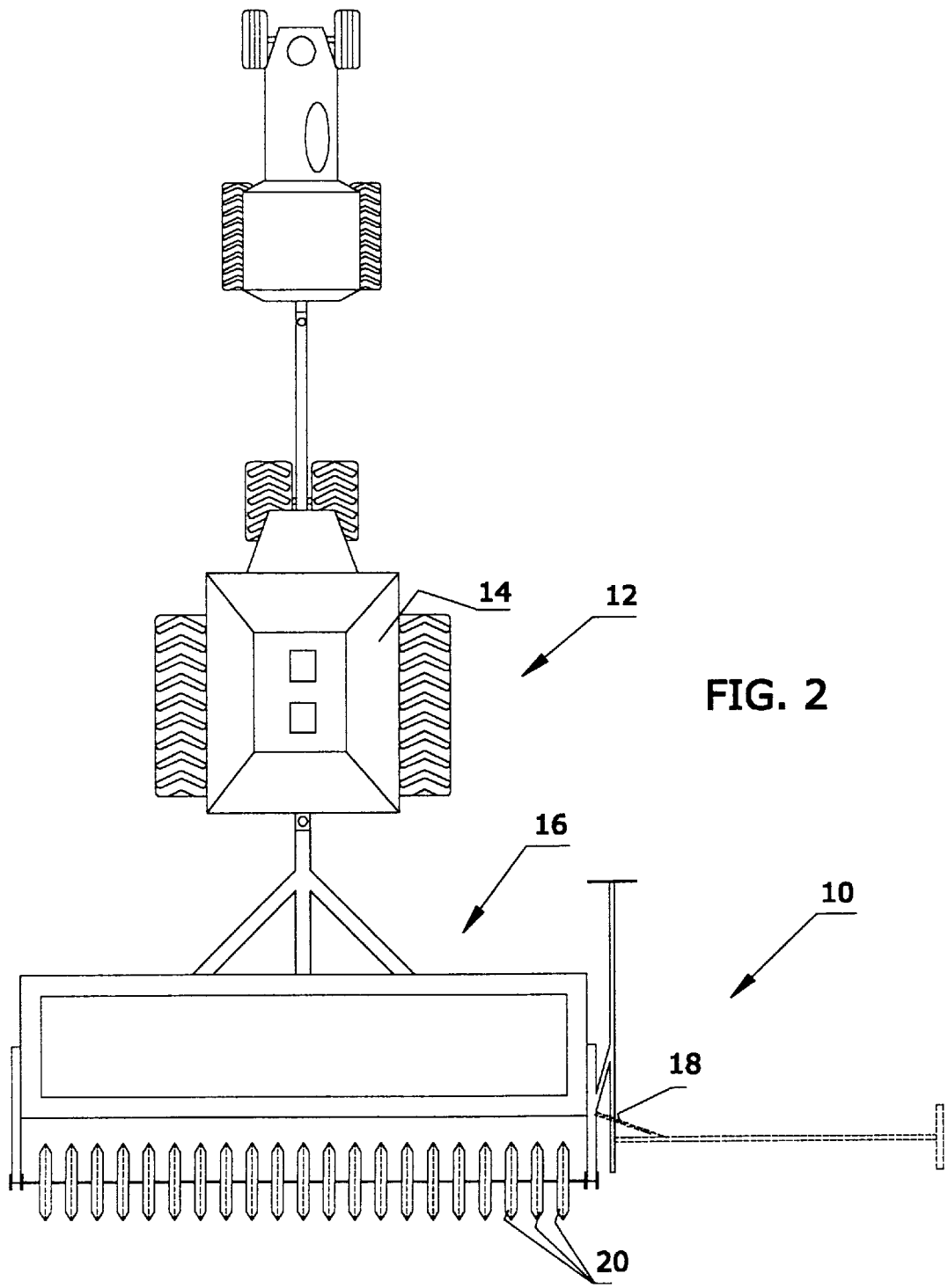
FIG. 2 is a plan view of the marker mounted on an air seeder.
Figure 3:
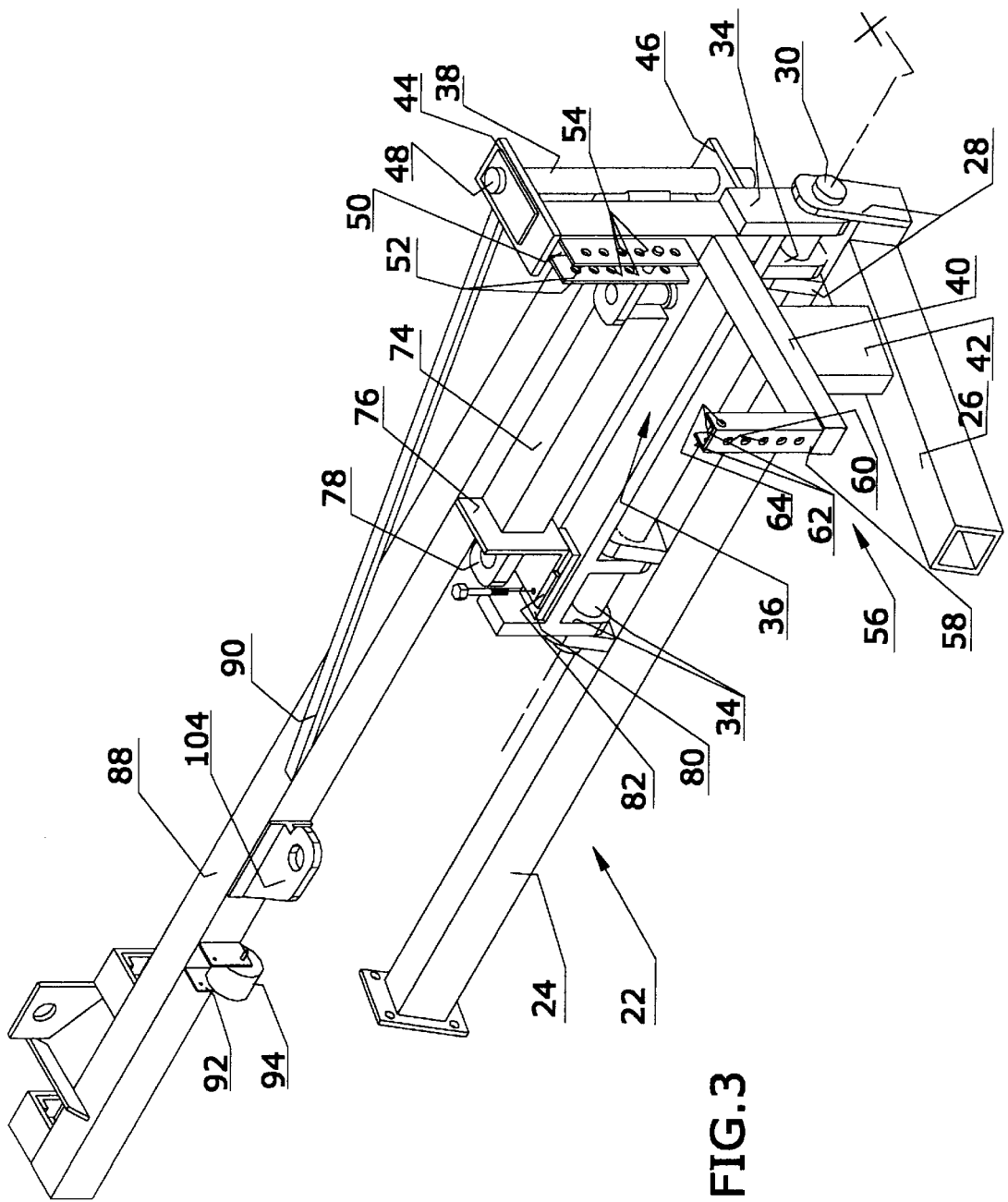
FIG. 3 is an isometric view of the marker mounting unit and a portion of the arm.
Figure 4:
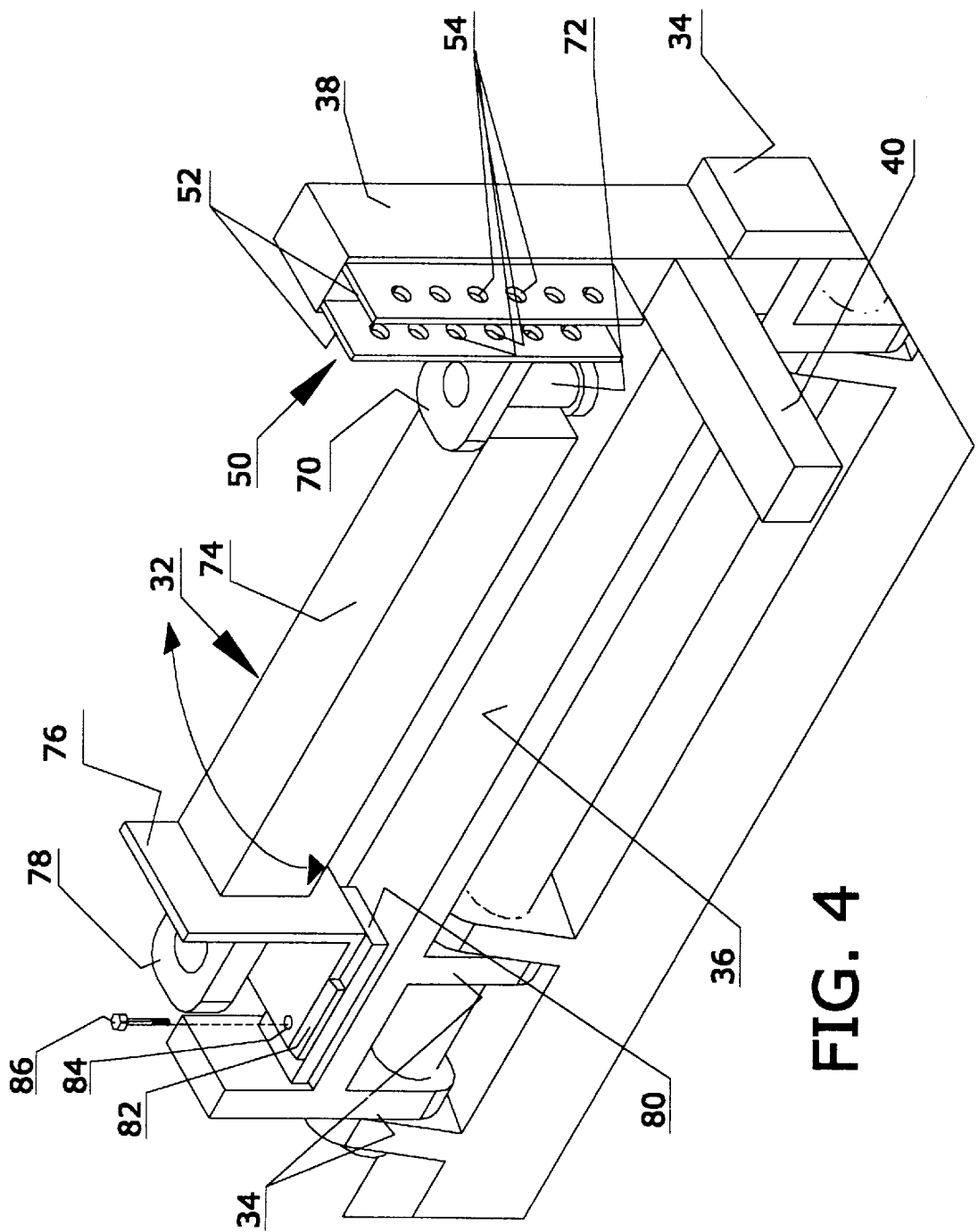
FIG. 4 is an isometric of a sub-frame.
Figure 5:
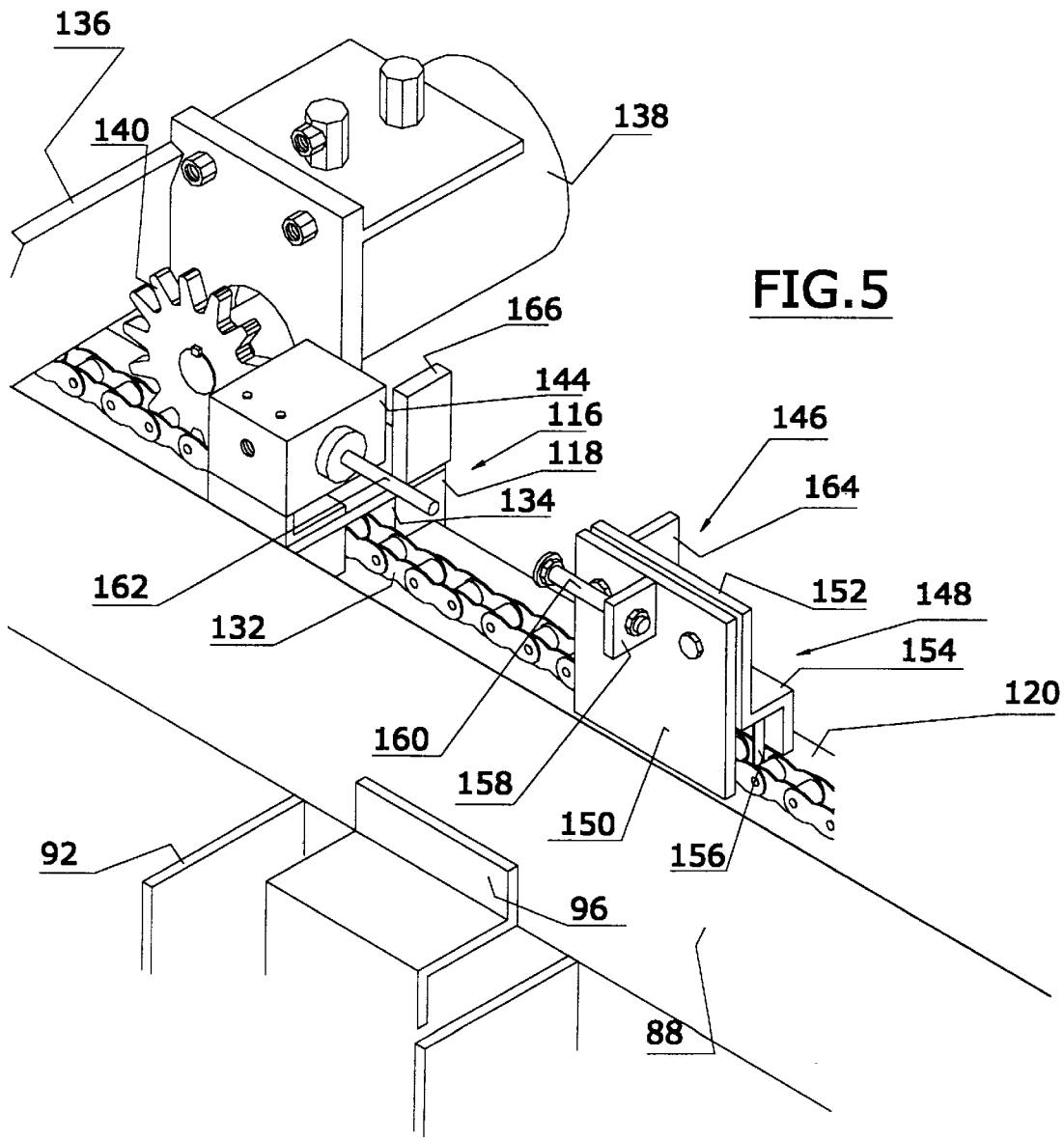
FIG. 5 is an isometric view showing the extension motor section of the marker.

Referring to the accompanying drawings, there is illustrated a field marker 10. In FIG. 2 the marker is shown mounted on an air seeder 12 with a seed tank 14 and a cultivator frame 16. The marker is mounted on the rear corner 18 of the cultivator frame. At the trailing end of the frame are packer wheels 20 which pack the soil of the furrows and support the trailing end of the cultivator to control the seeding depth.

The marker 10 has a base 22 which mounts the marker on the implement. The base includes a main beam 24 extends from rear to front along the side of the cultivator. At the rear end of the main beam is a cross beam 26. A set of lugs 28 mounted on the main beam adjacent its rear end mount a shaft 30 extending along the top of the main beam, adjacent its back end. A sub-frame 32 is mounted on the shaft to pivot on a longitudinal axis X. The sub-base includes a set of four lugs 34 that are mounted on the shaft 30 and carry a beam 36 parallel to the main beam 24. An upright member 38 is mounted at the rear end of the beam 36. A laterally extending stop 40 is mounted above the rear cross frame 26 by a spacer 42. Its outer end abuts the upright 38 to limit its pivotal movement inward about the axis X.

The upright 38 carries two outwardly extending plates 44 and 46 at its upper and lower ends respectively. These plates in turn carry an upright pivot shaft 48 for mounting the arm as will be discussed more fully in the following.

Figure 1:
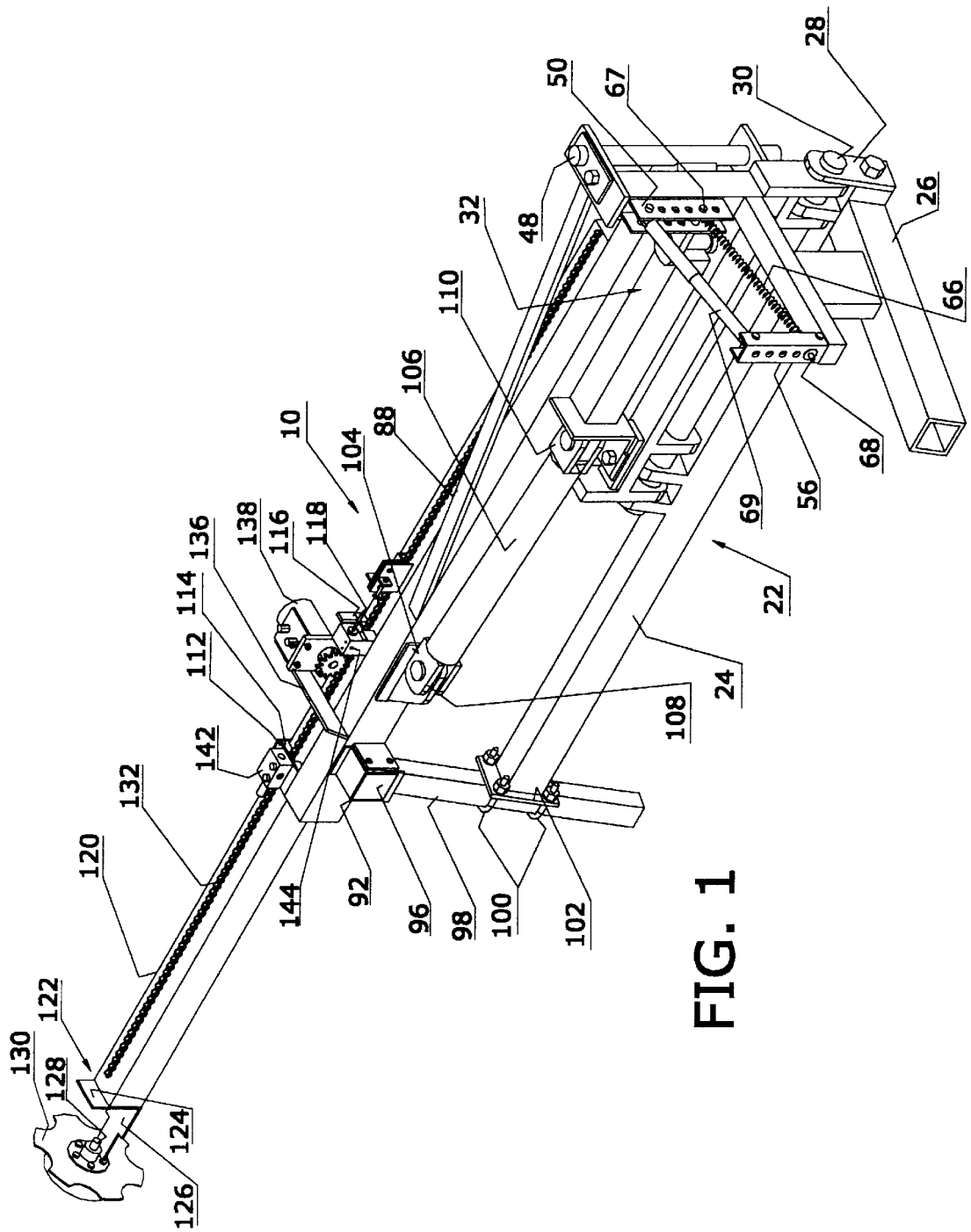
FIG. 1 is an isometric view of a field marker according to the present invention.

The inner side of the upright member 38 carries an upright channel 50 with two spaced flanges 52 with a series of aligned pin holes 54. A second channel 56 is mounted on the inner end of the stop member 40 and confronts the channel 50. The channel 56 has a web 58 with a series of spaced holes 60 and two flanges 62 with aligned holes 64 near the top end. As shown in FIG. 1, spring 66 extends between the channels 50 and 56 and has one end connected to the channel 50 by a cross pin 67 and the opposite end connected to the channel 56 by a threaded coupling 68. A damper 69 also links the channels 50 and 56. It is connected to the channel 56 with a pin through the hole 64 and to the channel 50 by a pin through two of the aligned holes 54.

On the front side of the upright 38 is a plate 70 that projects to the front over the beam 36. It carries a pin 72 which in turn carries a forwardly projecting arm 74. At the front end of the arm 74 is an angle bracket 76, which extends to the inner side of the arm. An upright flange of the angle 76 extends across the end of the arm 74 and a lug 78 projects forwardly from the upright flange. A forwardly extending base flange of the angle 76 rests on top of the arm 74 and on a plate 80 projecting inwardly from the top of the arm. A stop 82 along the inner side of the plate 80 limits inward pivotal movement of the arm 74 about the pin 72. A bolt hole 84 in the base flange of the angle 76 receives a shear bolt 86, which screws into a hole in the plate 80. In the event that the marker hits an obstruction when it is extended, the bolt 86 will shear and release the marker to pivot about the pin 72 to a position extending rearwardly from the cultivator frame, preventing damage to the marker.

A fixed arm section 88 is mounted on the upright shaft 48 to pivot around the shaft. A brace 90 extends from the top of the arm section 88 at about its mid-point to the top of a sleeve 91 fixed to the end of the arm section and mounted rotatably on the upright shaft 48. Partway along the arm section 88 is a channel-shaped bracket 92 carrying a roller 94. As illustrated most particularly in FIG. 1, this roller engages in a cradle 96 to support the arm in the transport position extending forwardly above the main beam 24. The cradle 96 is mounted on a support column 98 fixed by two U-bolts 100 to an end plate 102 on the front end of the main beam 24.

Partway along the arm section 88 is a lug 104. An hydraulic cylinder 106 has a clevis 108 pinned to the lug 104 and a clevis 110 at the opposite end pinned to the lug 78. Extension of the cylinder will pivot the arm about the upright shaft 48 until the cylinder bottoms out with the arm projecting laterally from the implement frame.

On the side of the arm section 88 opposite the support roller 94 is a bracket 112. This contains a high density polymer bushing 114. A similar bracket 116 with a bushing 118 is spaced along the arm section 88 from the bracket 112. An outer arm section 120 slides in the two bushings 114 and 118. At its outer end is a bracket 122 with a flange 124 extending across the end of the outer arm section and a flange 126 projecting from the end of the arm section. A shaft 128 is mounted on the flange 126 and carries the marker disc 130.

A roller chain 132 extends along the top of the outer arm section 120. The side plates of the chain are welded in place. The chain rides through slots 134 in the bushings 114 and 118.

Between the brackets 112 and 116, the inner arm section 88 carries a motor bracket 136. This extends across the top of the outer arm section and carries a reversible hydraulic motor 138. A sprocket 140 on the motor shaft meshes with the chain 132 so as to act as a pinion driving the chain as a rack.

The two brackets 112 and 116 carry hydraulic valves 142 and 144 which act as shut-off valves for the motor 138. Valve 142 is actuated by the flange 124 on the end of the outer arm when the outer arm is fully retracted. The valve 144 is actuated by a valve actuator 146. This includes a clamp 148 consisting of two plates 150 and 152. Plate 152 has an offset 154 at the bottom end for engagement over the chain 132. A tooth 156 projects from the offset into engagement with the chain so that the valve actuator will travel with the chain and the outer arm section. A lateral plate 158 on plate 150 carries a carriage bolt 160 the head of which will engage the pin 162 of the valve 144 when the arm has reached the desired extension. A stop plate 164 on the valve actuator 146 engages a stop plate 166 on the bracket 116 for limiting the travel of the outer arm on the inner.

In use of the marker, the valve actuator 146 is set to a position along the outer arm that will provide an extended arm length positioning the marker one-half the width of the implement from the side of the implement on which it is mounted. This provides a center line mark for the tractor towing the implement on its next pass. In the transport position, the arm is fully retracted and positioned extending forwardly along the side of the implement. The arm is supported by the cradle 96 which has a downwards and inwards inclination. To extend the marker, hydraulic fluid is supplied under pressure to both the cylinder 106 and the motor 138. This swings the arm outwardly around the upright pivot shaft 48 and extends the outer arm on the inner arm until the valve actuator 146 actuates the valve 144 to stop the motor. As the arm pivots outwardly and extends, its center of gravity moves away from the shaft 30, exerting a greater downward moment on the spring 66. This will stretch the spring allowing the arm to pivot downwardly into contact with the ground that it is to mark. Any tendency to bounce is controlled by the damper 68.

When the arm is fully extended, the cylinder 106 is also fully extended and acts in tension to hold the arm in place.

Moving the arm to the transport position is the reverse, with hydraulic fluid being supplied to the motor 138 and the cylinder 106 to retract the outer arm and to pivot the arm as a whole to the transport position. As the arm is retracted and swung to the forwards position, the moment on the spring 66 is reduced and the spring acts to rotate the arm about the shaft 30.

When in the transport position, the cradle 96 will retain the arm in place under its own weight. When the cultivator frame is folded for transport, this retention is adequate where the frame has single or double-fold wings. With a five-fold cultivator, the arm must be pinned in place.

While one embodiment of the present invention has been described in the foregoing, it is to be understood that other embodiments are possible within the scope of the invention and are intended to be included herein. The invention is to be considered limited solely by the scope of the appended claims.

I claim:

1. A field marker for use on an agricultural implement having a frame for traversing a field in a forwards direction, for marking the path of travel of the implement over the field, the marker comprising:

a marker arm with an outer marker end and an inner, mounting end;

marking means mounted on the arm at the marker end for marking the field;

an arm mount including a vertical pivot for mounting the inner, mounting end of the arm on the frame for pivotal movement about a vertical axis between a transport position projecting in the forwards direction from the arm mount and a use position projecting laterally from an end of the frame, transversely to the direction of travel;

an arm actuator selectively actuable to move the arm between the transport and use positions, the actuator being connected to the arm at a position between the mounting end and the marker end; and an actuator mount for connecting the actuator to the frame forwardly of the upright pivot, whereby the actuator extends rearwardly from the frame to the arm in the use position of the arm.

2. A marker according to claim 1 wherein the arm mount further comprises a lift pivot mounting the arm for movement about a lift axis transverse to the upright axis.

3. A marker according to claim 2 including a spring biasing the arm to pivot upwardly about the lift axis.

4. A marker according to claim 3 including shock absorbing means for damping movements of the spring.

5. A marker according to claim 1 wherein the arm actuator comprises an hydraulic cylinder coupling the marker arm and the arm mount, the cylinder being retracted and extending along the arm in the transport position of the arm and being extended in the use position of the arm.

6. A marker according to claim 1 including a cradle engagable with the arm for supporting the arm in the transport position, and means for mounting the cradle on the frame.

7. A marker according to claim 1 wherein the arm comprises a first arm section mounted on the arm mount a second arm section and means mounting the second arm section on the first arm section for sliding movement along the first arm section between a collapsed condition and an extended condition of the arm.

8. A marker according to claim 7 wherein the means mounting the second arm section on the first arm section comprise bearing means.

9. A marker according to claim 7 including arm extending means mounted on the arm for moving the second arm section between the collapsed and extended conditions of the arm.

10. A marker according to claim 1 wherein the actuator mount includes a releasable connector.

11. A marker according to claim 10 wherein the releasable connector comprises a shear connector.

12. A field marker for use on an agricultural implement for marking the path of travel of the implement in a forwards direction over a field, the implement having a frame in the marker comprising:

a marker arm with an outer marker end and an inner, mounting end, the arm comprising a first arm section mounted on an arm mount, a second arm section and means mounting the second arm section on the first arm section for sliding movement along the first arm section between a collapsed condition and an extended condition;

a marker mounted on the arm at the marker end for marking the field;

the arm mount for mounting the arm on the frame for movement between a transport position projecting forwardly from the mount and a use position projecting laterally from the frame;

an arm actuator selectively actuable to move the arm between the transport and use positions;

an arm extending means comprising a rack along the second arm section, a pinion mounted on the first arm section and meshing with the rack, and pinion drive means for driving the pinion for moving the second arm section between the collapsed and extended conditions of the arm.

13. A marker according to claim 12 wherein the rack comprises a chain and the pinion comprises a sprocket.

14. A field marker for marking the path of travel of an agricultural implement, the implement in a forwards direction over a field, the implement having a frame and the marker comprising:

a marker arm with an outer marker end and an inner, mounting end and comprising a first arm section mounted on an arm mount, a second arm section and means mounting the second arm section on the first arm section for sliding movement along the first arm section between collapsed and extended conditions of the arm;

a marker mounted on the arm at the marker end for marking the field;

the arm mount for mounting the arm on the frame for movement between a transport position projecting forwardly from the arm mount and a use position projecting laterally from the frame with the second arm section positioned rearwardly of the first arm section;

an arm actuator selectively actuable to move the arm between the transport and use positions; and an arm extending means mounted on the arm for moving the second arm section between the collapsed and extended conditions of the arm.

15. In combination an agricultural implement having a frame for traversing a field, soil working tools mounted on the frame and frame supporting wheels mounted on a trailing end of the frame and a field marker mounted on the frame, the marker having:

a marker arm with an outer, marker end and an inner, mounting end;

a marker mounted on the arm at the marker end thereof for marking the field;

an arm mount mounting the mounting end of the arm on the frame at the trailing end of the frame for movement between a transport position projecting forwardly from the trailing end of the frame and a use position projecting laterally from the trailing end of the frame; and an arm actuator selectively actuable to move the arm between the transport and use positions.

16. The invention according to claim 15 wherein the arm actuator comprises an hydraulic cylinder coupling the marker arm and the arm mount, the cylinder being retracted and extending along the arm in the transport position of the arm and being extended and positioned forwardly of the arm in the use position of the arm.

17. The invention according to claim 15 wherein the arm comprises a first arm section mounted on the arm mount, a second arm section and means mounting the second arm section on the first arm section for sliding movement along the first arm section between a collapsed condition and an extended condition of the arm.

18. The invention according to claim 17 wherein the means mounting the second arm section on the first arm section comprise bearing means mounting the second arm section.

19. The invention according to claim 18 wherein in the use position of the arm, the second arm section is positioned rearwardly of the first arm section.

20. A field marker for use on an agricultural implement having a frame for traversing a field in a forwards direction, for marking the path of travel of the implement over the field, the marker comprising:

a marker arm comprising a first arm section, a second arm section and means mounting the second arm section on the first arm section for sliding movement along the first arm section between a collapsed condition and an extended condition of the arm;

marking means mounted on an outer, marker end of the second arm section for marking the field;

an arm mount including a vertical pivot for mounting an inner, mounting end of the first arm section on the frame for pivotal movement about a virtical axis between a transport position projecting in the forwards direction from the arm mount and a use position projecting laterally from an end of the frame, transversely to the direction of travel;

an arm actuator cylinder selectively actuable to move the arm between the transport and use positions; and an arm extending motor for moving the second arm section along the first arm section between the collapsed and extended conditions of the arm.

* * * * *